Aug. 3, 1965    A. FISHER    3,198,975
EDDY CURRENT COUPLING
Filed March 2, 1962
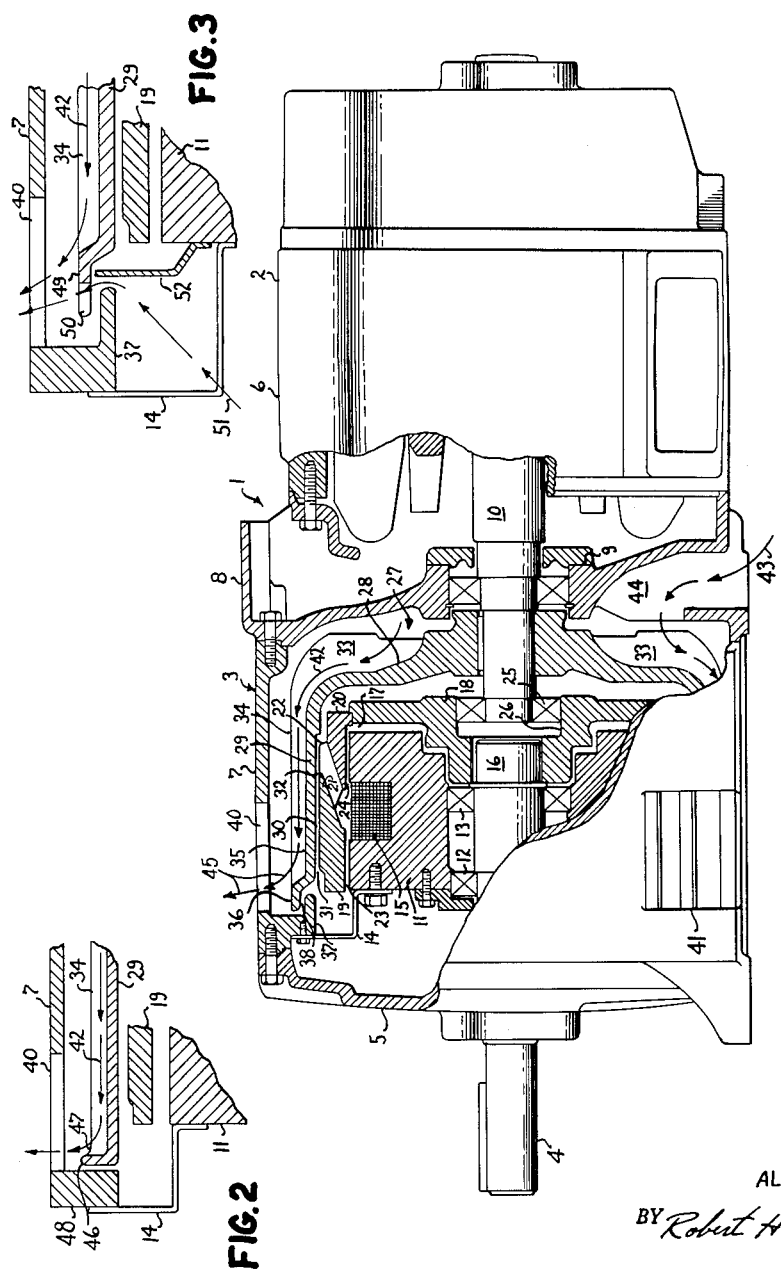
INVENTOR.
ALEC FISHER
BY Robert H. Montgomery
ATTORNEY United States Patent Office 3,198,975
Patented Aug. 3, 1965

3,198,975
EDDY CURRENT COUPLING
Alec Fisher, Erie, Pa., assignor to General Electric Company, a corporation of New York
Filed Mar. 2, 1962, Ser. No. 177,020
6 Claims. (Cl. 310—105)

This invention relates to electric drive units, and more particularly to eddy current couplings and electric drive units including eddy current couplings.

An eddy current coupling is a torque-transmitting device operating on the principle that a current induced in a closed conductor creates a magnetic field in opposition to the magnetomotive force inducing the current. In an eddy current coupling of the type hereinafter described, an annular inductor member provides a closed conductor, and flux concentrations produced by a flux-producing member create eddy currents in the drum, which in turn set up a magnetic field of opposite polarity to the flux-concentrating member.

Upon relative rotation of the inductor member and the flux-concentrating member, one member dependent on which is the driving member produces a drag or torque on the second member due to the magnetic coupling therebetween. The second member then rotates at a speed dependent upon the degree of magnetic coupling therebetween and the load demand on the second member. The power input to the shaft of the driving member appears as power output at the shaft of the driven member and as heat losses due to eddy currents in the inductor drum (not considering bearing friction and windage losses). Since the speed of the driving member is usually essentially constant, it may be seen that when the output shaft is driven at low speeds (the power output being proportional to the product of torque and speed), there will be considerable heat generated in the drum by eddy currents due to the relatively large differential speed (slip) between the drum and the flux-concentrating member.

The heat generated in the drum member must be removed to prevent overheating of the drum and resultant damage thereto. Eddy current couplings may be classified, by one line of consideration, as air-cooled and liquid-cooled. Generally speaking, in higher horsepower ratings and where high slip speeds are continuously encountered, liquid-cooled couplings, are commonly utilized. Liquid-cooled couplings as compared to air-cooled couplings, are more expensive in that they require piping, liquid temperature sensing and flow control means, and more complex bearing seals.

Air-cooled couplings, being less expensive to manufacture and install, are generally preferable where the ambient atmosphere does not carry dirt and dust which may settle in and clog air gap(s) of the coupling and prevent or hinder rotation of the elements of the coupling, and also where cooling liquid is not readily available or desired.

In environments such as cement plants, chemical plants, paper mills, tobacco processing lines, and other environments where the substance being manufactured or processed may be carried by the ambient air into the coupling, particularly where such substances may acquire moisture from the air which later evaporates to leave a hardened or caked residue which would clog the air gaps, it has been common practice to utilize liquid-cooled couplings and their necessary piping, flow controls, etc., or use totally enclosed air-cooled machines. When totally enclosed couplings are used, they must necessarily be considerably down-rated from their normal rating due to their more limited heat-dissipating capabilities.

Therefore, the present invention contemplates the provision of a new and improved air-cooled eddy current coupling drive which may be utilized in contaminated atmospheres without sealing the coupling housing from the contaminated atmosphere and which utilizes ambient air for ventilation.

Accordingly, it is a primary object of this invention to provide a new and improved air-cooled eddy current coupling drive wherein cooling air flow may be directed over the heat-generating element of the coupling even though the coupling must operate in a dirty or contaminated atmosphere.

It is a further object of this invention to provide a new and improved air-cooled eddy current coupling wherein ventilating flow of ambient air through said coupling is prevented from entering the air gaps of the machine.

It is another object of the invention to provide a new and improved air-cooled eddy current coupling which may be efficiently operated in environments which might otherwise prohibit the use of air-cooled eddy current couplings therein.

Briefly stated, the invention in one form thereof comprises an eddy current coupling of the type having an outer rotatable inductor member concentrically overlying a flux-concentrating member which is mounted on a first rotatable shaft. The inductor member is mounted on a second rotatable shaft by means of an imperforate supporting or web member. The shafts are rotatably supported in a housing member having air inlet apertures adjacent the imperforate supporting web of the inductor member and air exhausting apertures or louvers positioned to exhaust the ventilating air after it has traveled the length of the inductor member. The inductor member drum includes means to draw and direct air into the machine and over the outer periphery of the drum upon rotation thereof, and means are further provided by the housing member to cooperate with the second end of the drum to direct air out of the housing and also to prevent ambient air from entering the air gaps of the machine.

The novel features of the invention are pointed out with particularity in the claims appended to and forming a part of this specification. However, it is believed that the organization and operation of the invention, together with further objects and advantages thereof, may be best understood from the following description taken in conjunction with the drawings wherein:

FIG. 1 illustrates an eddy current coupling drive unit embodying the invention; and FIGS. 2 and 3 illustrate modifications of the eddy current coupling of FIG. 1.

Referring now to the drawings, FIG. 1 illustrates an eddy current coupling in which drive unit 1 comprises a motor 2, preferably of the induction type adapted to operate at an essentially constant speed. The motor 2 is adapted to receive power from an electric power source, not shown. The drive unit 1 further comprises an eddy current coupling 3 having an output shaft 4 rotatably supported in an imperforate end shield or housing member 5. The motor 2 and coupling 3 include generally annular housing members 6 and 7 respectively. The housing members 6 and 7 in the illustrated drive unit are joined together by a housing adapter member 8 which provides a bearing bracket 9 for rotatably supporting the shaft 10 of motor 2.

The housing adapter member utilized in the illustrated eddy current coupling is preferably of the type disclosed and claimed in Patent 3,020,427, Charles M. Wheeler and Philip M. Folger, assigned to the same assignee as this application. The housing adapter 8 is fully described in the aformentioned patent. Briefly, the adapted 8 defines a plurality of mutually isolated air-directing paths into each the coupling 3 and the motor 2 so that the air flow into one machine through the housing adapter 8 is independent of air flow into the other machine through the housing adapter 8. The illustrated eddy current coupling comprises a stationary core member 11 of magnetizable material which is supported on output shaft 4 by bearing assemblies 12 and 13. The core member 11, which is rendered non-rotatable by a connecting link 14 between the core and some portion of the eddy current coupling housing or end shield, carries an exciting coil 15 thereon between pole-forming legs thereof. The exciting coil 15 is adapted to be energized from a direct current source, not shown, to induce a magnetic field through the core and other eddy current coupling members hereinafter described. Mounted on output shaft 4 at portion 16 thereof is a flux-concentrating member 17 which comprises a radially extending web portion 18 which supports pole rings 19 and 20 of magnetizable material. Interdigitating, flux-concentrating, pole-forming teeth 21 and 22 of magnetizable material extend from the pole rings 19 and 20. Pole rings 19 and teeth 21 thereon are supported from pole ring 20 or teeth 22 by suitable non-magnetic supporting and spacing means therebetween, not shown.

It is to be understood that the core member 11 and flux-concentrating teeth 21, 22 of member 17 could be made integral and the resulting core and flux-concentrating member be mounted on shaft 4 for rotation therewith. The pole rings 19 and 20 have smooth annular inner surfaces which, together with the smooth annular surfaces of the legs of core 11, define air gaps 23 and 24 therebetween.

The coupling shaft 4 is aligned with and supported on the motor shaft 12 by means of a pilot bearing assembly 25 having an inner race mounted on motor shaft 10 and an outer race received in a bearing-receiving cavity 26 defined by the web or support portion 18 of the flux-concentrating member.

Mounted on the end of motor shaft 10 extending into coupling housing 7 and adapted for rotation therewith is an eddy current coupling inductor member 27 which, in accordance with one aspect of the invention, comprises an imperforate hub and web portion 28 which supports one end of an eddy current inductor drum 29 which concentrically overlies the flux-concentrating teeth 21 and 22 and the annular core member 11.

The drum 29 has a smooth cylindrical inner surface 30 which defines air gaps 31 and 32 with the outer surfaces of pole-forming teeth 21 and 22 respectively. The inductor member 27 provides fan means comprising a plurality of spaced vanes or air moving and directing blades 33 extending, generally radially with respect to shaft 4, from the web and hub portion 28 thereof.

The vanes or blades 33, in the illustrated coupling, may extend into fins 34 on the outer surface 35 of drum 29 to increase the outer surface 35 area thereof. The fins 34 are peripherally spaced about the surface 35 and extend generally axially thereon with respect to coupling shaft 4. It is not critical that the fins 34 be extensions of the blades 33; however, for economy and ease of manufacture, particularly where inductor member 27 is a one-piece casting, it is desirable. Additionally, the number of fins 34 provided on surface 35 of drum 29 may be greater than the number of vanes 33.

In accordance with the invention, means are provided to cause air flow into the coupling and over the outer surfaces of inductor member 27 to remove heat therefrom and to prevent entrance of ambient air carrying contaminating particles into the air gaps. In the illustrated coupling, the overhanging end of annular drum 29 is provided with an extension or lip 36 which co-operates with a complementary annular sealing member 37 extending generally radially inwardly from housing member 3. A small running clearance 38 is provided between the lip 36 and sealing member 37. The lip 36 is preferably shaped to direct air flowing along the outer surface 35 of drum 29 and fins 34 thereon, out of the housing 3 and through exhaust aperture 40 and louvered apertures 41 which are located adjacent lip 36, the louvered openings being preferably located on either side of housing 3. The annular sealing member 37 in conjunction with lip 36 blocks flow of ventilating air over the surface 35 and fins 34, as depicted by the series of arrows.

The aperture 40 is shown in the illustrated coupling primarily to illustrate exhaust of ventilating air flow over the fins 34 and surface 35, and in practice would not be located in the upper portion of the housing as illustrated.

Consider now the operation of the illustrated coupling. When motor 2 is energized, shaft 10 is rotatably driven, as is inductor member 27 mounted thereon. When coil 15 is excited, a toroidal magnetic field is set up which is directed from one leg of the core 11; across one of the air gaps 23, 24; into one of the pole rings 19, 20 and flux-concentrating pole teeth thereon; across one of air gaps 31, 32; into the drum 29; across the other of air gaps 31, 32; into the pole teeth of the second of pole rings 19, 20; and across the second of air gaps 19, 20 to the other leg of the core member.

Inasmuch as the outer surfaces of core member 11 and the inner surfaces of pole rings 19 and 20 are smooth, no eddy currents are generated in these surfaces. The air gaps 23 and 24 may be referred to as auxiliary or parasitic air gaps, while the air gaps 31 and 32 may be referred to as working air gaps.

The magnetic flux traversing gaps 31 and 32 is concentrated into regions of high and low flux density across gaps 31 and 32 by teeth 19 and 20, and the flux concentrations entering and leaving drum 29 create eddy currents in and adjacent inner surface 30 of drum 29. The generated eddy currents set up a magnetic field of polarity opposite to pole teeth 21 and 22 and therefore as inductor member 27 is rotated, the magnetic interaction between drum 29 and flux-concentrating teeth 21 and 22 produce a torque on shaft 4, which rotates with drum 29 at a speed dependent on the degree of magnetic coupling between inductor member 27 and flux-concentrating member 17.

The losses generated in the drum 29 due to the differential speed between the flux-concentrating member 17 and the inductor member 27 causes heating of the drum member.

The heat generated in the drum member, by practice of this invention, may be removed using the ambient air of a dirt or dust ladened atmosphere without introducing the contaminated atmosphere into the air gaps 23, 24, 31 and 32. When the drum is rotated, the vanes 33 draw air into the coupling housing through a plurality of air intake and directing paths 44 defined in the housing adapter 8 adjacent the imperforate web portion 28 of the inductor member 27. The vanes 33 draw in the ventilating air and direct it over the outer surface 35 of the drum 29 and the cooling fins 34 thereon, as indicated by the series of arrows 42 and 43. The air flow directed along the length of the outer periphery of the drum and the cooling fins thereon produces a wiping action on the drum and fins and removes heat therefrom. As the air flow along the length of the drum reaches lip portion 36 of the drum, it is directed as shown in the illustration by the series of arrows 45 through aperture 40 and exhausted into the ambient atmosphere. The annular sealing member 37, together with lip 36 of the drum, provides a running seal which blocks entrance of contaminated ventilating air into the interior of drum 29 and into the air gaps 23, 24, 31 and 32 of the coupling.

The sealing means which prevent entrance of air flow into the interior of the drum, and hence the air gaps 23, 24, 31 and 32, may take any suitable shape or form. Reference is now made to FIG. 2 which illustrates a modification of FIG. 1. In FIG. 2 like elements to those illustrated in FIG. 1 bear the same identifying numerals. The drum 29 of FIG. 2 is outwardly turned at the overhanging end 46 thereof and fins 34 also curve outwardly of the drum to form vanes 47 which further add in directing the ventilating air 42 out of the housing 7 after it has traveled the length of the drum 29. The annular sealing member 48 is shaped to provide a running seal with the outwardly turned end 46 of drum 29.

In some cases it may be desired to circulate air about the drive end bearing, not shown, which rotatably supports shaft 4 in end shield 5. The structure of FIG. 3 illustrates one modification of the invention which would allow confined circulation of air about the drive end bearing housing. In this embodiment of the invention, the end shield 5, as illustrated in FIG. 1, may be provided with apertures therein, not shown, which may be located in proximity to the bearing housing. In this particular modification of the invention, the overhanging end 49 of drum 29 has a plurality of circumferentially spaced fan blade members 50 extending therefrom which, upon rotation of the inductor member 27, will draw air through apertures, not shown, in end shield 5, as indicated by the series of arrows 51. As will be noted from this series of arrows 51, air will be drawn in through the end shield by the fan blade members 50 and directed out of the housing 7. To prevent contaminated air from entering into the air gaps of the machine and depositing particles in the air gaps, an annular baffle or seal 52 is provided. The sealing member 52, as illustrated, may take the form of a dished washer-like member secured to the core 11 adjacent its inner periphery by any suitable means, such as bolts.

In applications where the possibility exists of overheating the elements of the coupling within the drum, more specifically, the exciting coil 15 and the bearings and lubricants therefor, compensation for higher temperature operation of these elements may be made by using for example a class H magnet wire to form the coil 15, and heat stabilized bearings together with suitable lubricants therefor, such as synthetic ester base lubricants.

While a preferred form of the invention has been illustrated and described for purposes of disclosure, various modifications may be made in the illustrated structure without departing from the scope of the invention. For example, the invention is equally applicable to a freestanding eddy current coupling as well as to the integrated motor-eddy current coupling drive unit 1, illustrated. In such application a conventional end shield having air inlet apertures defined therein, and having a bearing bracket for rotatably supporting an inductor member drive shaft, would be secured to the annular housing member 7 of the eddy current coupling instead of the illustrated housing adapter 8.

The particular structure and shape of the drum and annular sealing member may take any structure or shape desired which will perform the function of directing the ventilating air flowing along the length of the drum out of the housings and preventing air flow into the air gaps of the coupling. The annular sealing member, as represented by sealing member 36, FIG. 1, may be made integral with the housing member 7 or end shield 5; or the annular sealing member 36 may be a separate member which is secured between the end of the housing 7 and the end shield 5. If there should be a tendency to have undesirable flux leakage from the drum to the sealing member because of their close proximity in defining a running seal, the annular sealing member may be made of nonmagnetic material, in which case it would most likely be made as a separate member and then secured between the end shield 5 and the end of housing 7.

Inasmuch as other embodiments of the invention and modifications to the disclosed embodiment and modifications thereof may be apparent to those skilled in the art, it is intended in the following claims to include all modifications and embodiments of the invention which do not depart from the spirit and scope of the invention.

What is claimed as new and is desired to secure by Letters Patent of the United States is:

1. An eddy current coupling comprising:
   a housing member;
   first and second axially aligned shafts rotatably supported by said housing;
   a flux-concentrating member mounted on said first of said shafts for rotation therewith;
   an inductor member adapted to be rotatably driven by the second of said shafts, said inductor member comprising an annular inductor drum portion concentrically overlying said flux-concentrating member and having an imperforate web portion supporting one end of said drum portion thereof on said second shaft;
   air inlet apertures defined in said housing adjacent the said supported end of said drum;
   fan means on said web portion adapted to draw air into said housing and direct the air over the outer surface of said drum portion to remove heat therefrom;
   air exhaust apertures defined in said housing adjacent the other end of said drum portion whereby upon rotation of said second of said shafts air is drawn into said housing by said fan means, and directed over the outer surface of said drum portion toward the other end of said drum portion; and
   sealing means in said housing cooperating with said other end of said drum portion to direct air flowing over said drum portion through said exhaust apertures and block entrance of air flowing into the interior of said drum portion.

2. The eddy current coupling of claim 1 wherein fan means are carried by said other end of said drum portion to direct air flowing over said drum through said exhaust apertures.

3. The eddy current coupling of claim 1 wherein said other end of said drum is shaped to direct air flowing along said drum portion toward said exhaust apertures.

4. The eddy current coupling of claim 3 wherein said other end of said drum concentrically overlies said sealing member.

5. An eddy current coupling comprising:
   a housing member;
   first and second axially aligned shafts rotatably supported by said housing;
   a flux-concentrating member mounted on said first of said shafts for rotation therewith;
   an inductor member mounted on said second of said shafts for rotation therewith, said inductor member comprising an annular inductor drum portion concentrically overlying said flux-concentrating member and having an imperforate web portion supporting said drum portion from one end thereof on said second shaft;
   air inlet apertures defined in said housing adjacent the supported end of said drum;
   fan means on said web portion adapted to draw air into said housing and direct the air over the outer surface of said drum portion;
   air exhaust apertures defined in said housing adjacent the other end of said drum portion whereby upon rotation of said second of said shafts air is drawn into said housing by said fan means, directed over the outer surface of said drum portion toward the other end of said coupling; and
   annular sealing means carried by said housing and cooperating with said other end of said drum portion to direct air flowing over said drum portion through said exhaust apertures and block entrance of air flow into the interior of said drum portion.

6. An eddy current coupling comprising:
   a housing member;
   first and second axially aligned shafts rotatably supported by said housing;
   a flux-concentrating member mounted on said first of said shafts for rotation therewith;

a stationary magnetizable core member within said flux-concentrating member;

an inductor member mounted on said second of said shafts for rotation therewith, said inductor member comprising an annular inductor drum portion concentrically overlying said flux-concentrating member and having an imperforate web portion supporting one end of said drum portion on said second shaft;

air inlet apertures defined in said housing adjacent the supported end of said drum;

fan means on said web portion adapted to draw air into said housing and direct over the outer surface of said drum portion;

air exhaust apertures defined in said housing adjacent the other end of said drum portion whereby upon rotation of said second of said shafts air is drawn into said housing by said fan means, directed over the outer surface of said drum portion to the other end of said coupling;

sealing means carried by said housing and cooperating with said other end of said drum portion to direct air flowing over said drum portion through said exhaust apertures and block entrance of air flow into the interior of said drum portion;

apertures defined in said housing about said first shaft to allow entrance of air therein; and baffling means for blocking flow of air into the interior of said drive from said last-mentioned apertures.

References Cited by the Examiner

UNITED STATES PATENTS 3,047,754  7/62  Jaeschke _____ 310—105

MILTON O. HIRSHFIELD, *Primary Examiner*.